United States Patent
Yang et al.

(10) Patent No.: US 11,879,472 B2
(45) Date of Patent: Jan. 23, 2024

(54) CONTROL SYSTEM FOR ELECTRIC FLUID MOVING SYSTEMS

(71) Applicant: Regal Beloit America, Inc., Beloit, WI (US)

(72) Inventors: Bin Yang, Fort Wayne, IN (US); Brian Lee Beifus, Fort Wayne, IN (US); Roger Carlos Becerra, Fort Wayne, IN (US)

(73) Assignee: Regal Beloit America, Inc., Beloit, WI (US)

( * ) Notice: Subject to any disclaimer, the term of this patent is extended or adjusted under 35 U.S.C. 154(b) by 874 days.

(21) Appl. No.: 16/813,307

(22) Filed: Mar. 9, 2020

(65) Prior Publication Data
US 2021/0277908 A1 Sep. 9, 2021

(51) Int. Cl.
*F04D 27/00* (2006.01)
*F04D 25/06* (2006.01)
*H02P 23/00* (2016.01)

(52) U.S. Cl.
CPC ........... *F04D 27/004* (2013.01); *F04D 25/06* (2013.01); *H02P 23/0004* (2013.01)

(58) Field of Classification Search
CPC ..... F04D 25/06; F04D 27/004; H02P 23/0004
See application file for complete search history.

(56) References Cited

U.S. PATENT DOCUMENTS

| | | | |
|---|---|---|---|
| 5,736,823 A | 4/1998 | Nordby et al. | |
| 6,353,302 B1* | 3/2002 | Ramachandran | H02P 6/085 417/42 |
| 7,567,049 B2 | 7/2009 | Shahi et al. | |
| 9,625,172 B2 | 4/2017 | Sasaki | |
| 9,631,830 B2 | 4/2017 | Sasaki | |
| 9,732,976 B2 | 8/2017 | Wang et al. | |
| 2009/0044794 A1* | 2/2009 | Hugghins | F23N 5/242 126/116 A |
| 2010/0256821 A1* | 10/2010 | Jeung | G05B 15/02 318/504 |
| 2017/0038089 A1* | 2/2017 | Wang | G05B 17/02 |
| 2021/0164658 A1* | 6/2021 | Costa | F23N 5/18 |

* cited by examiner

Primary Examiner — Essama Omgba
Assistant Examiner — Charles W Nichols
(74) Attorney, Agent, or Firm — Armstrong Teasdale LLP (57) ABSTRACT

A control system for an electric motor for a fluid moving apparatus includes a drive circuit and a processor. The drive circuit regulates power supplied to the motor to generate fluid flow. The processor is coupled to the drive circuit and controls the drive circuit to operate the motor at a first speed and torque, and at a second speed and torque, receive a first flow corresponding to the first speed and torque, determine a second flow based on a ratio of the first flow to the first speed, and corresponding to the second speed and torque. The processor is configured to define an algorithm based on the first and second speed, torque, and flow, compute a set point for a demanded flow using the algorithm, and control the drive circuit based on the set point to supply power to the motor and generate the flow.

21 Claims, 4 Drawing Sheets

CONTROL SYSTEM FOR ELECTRIC FLUID MOVING SYSTEMS

BACKGROUND

The field of the disclosure relates generally to a control system for an electric motor driving a fluid moving apparatus and, more specifically, a control system that enables in-field characterization for an electric motor driving a fluid moving apparatus.

At least some electric motors are torque-calibrated when manufactured to ensure the torque output at the drive shaft of the electric motor matches the torque commanded. At least some electric motors, particularly electric motors driving various types of fluid moving apparatuses, or "fluid movers," such as blowers including forward-curved blowers, backward-curved blowers, or radial blowers, or various types of fans, such as an axial fan or a vane axial fan, compressors, or pumps, are further calibrated to produce approximately a constant fluid flow during operation in either a torque-control mode or a speed-control mode. Constant fluid flow heating, ventilation, and air conditioning (HVAC) systems, for example, improve thermal comfort and energy savings. Constant fluid flow systems may also be used in certain refrigeration systems. In a constant fluid flow system, a control system for an electric motor receives a fluid flow rate demand, e.g., a value in cubic feet per minute (CFM), and then determines, e.g., by a polynomial or constant fluid flow algorithm, an appropriate motor torque or motor speed to produce approximately the fluid flow demanded. Notably, the actual fluid flow output can vary according to the fluid mover construction or output path, duct, space, or other restriction, into which the fluid flow is directed. In a torque-controlled implementation, for example, motor torque is regulated based on a monitored motor speed to produce the approximate fluid flow.

Calibration, or characterization, of a constant fluid flow system typically quantizes fluid flow output (e.g., in a lab) for a given speed and torque output when driving the fluid mover, often over a wide range of numerous operating points. The results of the characterization are then used to define certain aspects of the constant fluid flow algorithm and to configure the electric motor and fluid mover to produce the approximately constant fluid flow. It is desirable to simplify the characterization of a constant fluid flow system to ease configuration of an electric motor in the field.

BRIEF DESCRIPTION

In one aspect, a control system for an electric motor is provided. The electric motor is configured to drive a fluid moving apparatus to generate a fluid flow. The control system includes a drive circuit and a processor. The drive circuit is configured to regulate electrical power supplied to a stator of the electric motor to turn a rotor of the electric motor and generate the fluid flow. The processor is coupled to the drive circuit and is configured to control the drive circuit to operate the electric motor at a first speed and a first torque, and at a second speed and a second torque. The processor is further configured to receive a first fluid flow rate value corresponding to the first speed and the first torque. The processor is further configured to determine a second fluid flow rate value based on a ratio of the first fluid flow rate value to the first speed, and corresponding to the second speed and the second torque. The processor is further configured to define an algorithm, in a memory coupled to the processor, based on the first speed, the first torque, the first fluid flow rate value, the second speed, the second torque, and the second fluid flow rate value. The processor is further configured to compute an operating set point for a demanded fluid flow rate using the algorithm, and control the drive circuit based on the operating set point to supply electrical power to the electric motor and to operate the fluid moving apparatus to generate the fluid flow.

In another aspect, a method of characterizing a fluid moving apparatus is provided. The method includes operating an electric motor coupled to the fluid moving apparatus at a first speed and a first torque corresponding to a system resistance. The method includes receiving, at a control system for the electric motor, a first fluid flow rate value corresponding to the first speed and the first torque. The method includes operating the electric motor at a second speed and a second torque corresponding to the system resistance. The method includes determining, by the control system, a second fluid flow rate value based on a ratio of the first fluid flow rate value to the first speed, and corresponding to the second speed and the second torque. The method includes defining an algorithm, in a memory for the control system, based on the first speed, the first torque, the first fluid flow rate value, the second speed, the second torque, and the second fluid flow rate value. The method includes computing an operating set point for a demanded fluid flow rate using the algorithm. The method includes controlling a drive circuit of the control system based on the operating set point to supply electrical power to the electric motor and to operate the fluid moving apparatus to generate a fluid flow.

In yet another aspect, an electric motor for a constant fluid flow system is provided. The electric motor includes a rotor, stator, drive circuit, and processor. The rotor is coupled to a fluid moving apparatus configured to generate a fluid flow upon rotation of the rotor. The drive circuit is configured to regulate electrical power supplied to the stator to turn the rotor. The processor is coupled to the drive circuit and is configured to control the drive circuit to turn the rotor at a first speed and a first torque, and at a second speed and a second torque. The processor is configured to receive a first fluid flow rate value corresponding to the first speed and the first torque. The processor is configured to determine a second fluid flow rate value based on a ratio of the first fluid flow rate value to the first speed, and corresponding to the second speed and the second torque. The processor is configured to define an algorithm, in a memory coupled to the processor, based on the first speed, the first torque, the first fluid flow rate value, the second speed, the second torque, and the second fluid flow rate value. The processor is configured to compute an operating set point for a demanded fluid flow rate using the algorithm. The processor is configured to control the drive circuit based on the operating set point to supply electrical power to the stator and to operate the fluid moving apparatus to generate the fluid flow.

DETAILED DESCRIPTION

Embodiments of the control system and methods of operating an electric motor for a constant fluid flow system described herein provide an in-field characterization of a constant fluid flow system and, more specifically, the fluid moving apparatus, or fluid mover, using two or more data points corresponding to a single system resistance. Of the two or more data points, the control system needs only one fluid flow value corresponding to one of the two or more data points. The fluid flow value may be measured or computed based on, for example, a heat-rise test or a temperature differential measurement across an air conditioning coil, or by referencing a static pressure—CFM table. Fluid flow may, for example, be measured by a sensor or inferred based on actuation of a switch, such as a pressure switch.

Embodiments of the control system and methods described herein characterize the fluid moving apparatus utilizing, for example, correlations among torque (T), speed (N), and demanded fluid flow (Q). More specifically, the fluid mover may be characterized by a fluid flow algorithm, or "torque correlation," that defines, for example, torque (T) as a function of speed (N) and demanded fluid flow (Q). The torque correlation may take the form of, for example, a polynomial function (see EQ. 1), a tangential function (see EQ. 2), a natural logarithm function (see EQ. 3), or any other suitable function. In alternative embodiments, the fluid mover is characterized by a "speed correlation" that defines speed (N) as a function of torque (T) and demanded fluid flow (Q), which likewise may be expressed in various forms.

$$T = x_1 NQ + x_2 N \qquad \text{EQ 1}$$

where, T is torque, N is speed, Q is fluid flow, and $x_1$ and $x_2$ are constants derived from data points acquired during characterization.

$$T = N/\tan(x_1 Q + x_2) \qquad \text{EQ. 2}$$

where, T is torque, N is speed, Q is fluid flow, and $x_1$ and $x_2$ are constants derived from data points acquired during characterization.

$$T = N/x_1 \ln(Q) + x_2 \qquad \text{EQ. 3}$$

where, T is torque, N is speed, Q is fluid flow, and $x_1$ and $x_2$ are constants derived from data points acquired during characterization.

In a torque-controlled implementation, for example, the characterization embodied in the motor controller and methods described herein acquire one torque-speed-fluid flow data point and one or more other torque-speed data point that characterize the operating profile of the constant fluid flow system for a given single system resistance. Given the assumption that a fluid flow-speed ratio is constant for a given system resistance, fluid flow rate values for the one or more other torque-speed data points are computed from the one torque-speed-fluid flow data point. The fluid flow rate value may be determined, for example, by measuring fluid flow rate using a fluid flow sensor. In alternative embodiments, flow rate may be determined, or inferred, from the actuation of a switch, such as a pressure switch positioned in the output path. Such a switch may be configured to actuate at a predetermined or configurable threshold.

For torque-controlled implementations, the operating profile is approximated by an algorithm, or torque correlation, such as a polynomial function, a tangential function, a natural logarithm function, or any other suitable fluid flow algorithm or formula that defines motor torque (T) as a function of motor speed (N) and fluid flow rate demand (Q). Likewise, in a speed-controlled implementation, for example, the characterization embodied in the motor controller and methods described herein again acquire one torque-speed-fluid flow data point and one or more other torque-speed data point that characterize the operating profile of the constant fluid flow system for a given single system resistance. That operating profile is then approximated by an algorithm, or speed correlation, such as a polynomial function, a tangential function, a natural logarithm function, or any other suitable fluid flow algorithm or formula that defines motor speed (N) as a function of motor torque (T) and fluid flow rate demand (Q).

In an alternative speed-controlled embodiment, the formula for motor torque (T) described above may be used to compare a computed torque to a torque value in a speed-torque pair for the desired motor speed (N). A torque error value resulting from the comparison may then be used to drive the motor speed (N) to a target, or objective, value. In another alternative embodiment, motor power may be defined as a function of motor speed (N), motor torque (T), and fluid flow rate demand (Q). In either embodiment, the characterization described herein yields values for various coefficients that scale the various terms of the algorithm, sometimes referred to as a constant fluid flow algorithm. However, it is generally understood the actual fluid flow produced by such a constant fluid flow system using a constant fluid flow algorithm only approximates the demanded fluid flow due to numerous sources of error and variabilities in environmental and physical properties of the constant fluid flow system and the output path, duct, or space into which the fluid flow is directed.

Figure 1:
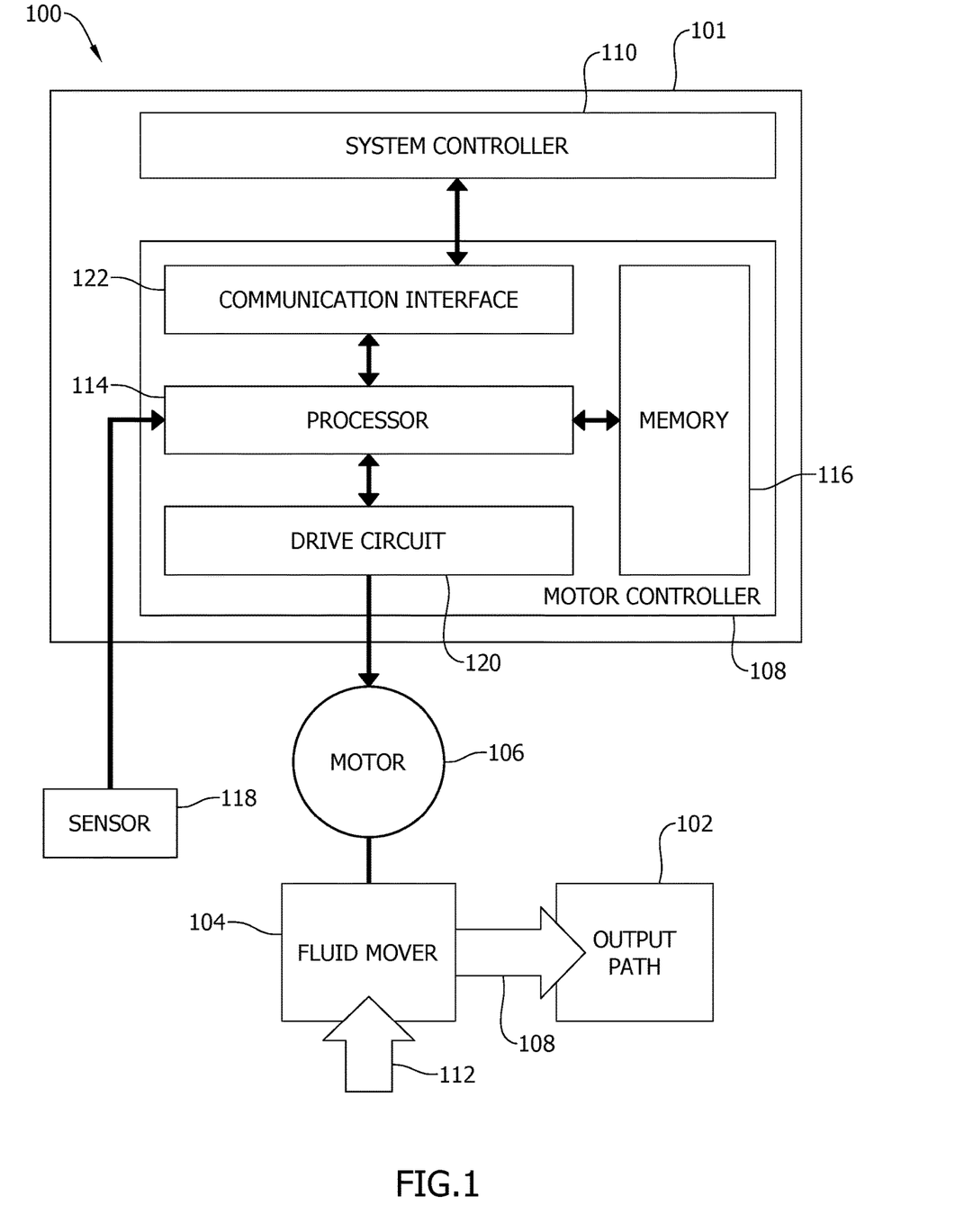
FIG. 1 is a block diagram of an exemplary constant fluid flow system.

FIG. 1 is a block diagram of a constant fluid flow system 100. Constant fluid flow system 100 includes a control system 101, an output path 102, a fluid mover 104, and an electric motor 106, including a rotor 105 and a stator 107. Control system 101 includes a motor controller 108 and a system controller 110. In certain embodiments, motor controller 108 is integrated with electric motor 106. In other embodiments, constant fluid flow system 100 may include additional, fewer, or alternative components, including those described elsewhere herein. For example, fluid mover 104 may be configured to generate a fluid flow into a space other than a defined duct, plenum, or other output path.

Fluid mover 104 is configured to generate a fluid flow 112 directed through output path 102. Output path 102 is configured to guide the fluid flow for circulation and distribution within a system, building, vehicle, or other structure. Output path 102, or alternatively the space into which fluid flow 112 is directed, has a fluid flow restriction, or system resistance (R), that affects the fluid flow output from fluid mover 104. The fluid flow restriction is based on various parameters that may affect fluid flow within constant fluid flow system 100, such as, but not limited to, the internal dimensions of output path 102, open or closed dampers, contaminants (e.g., dust) within output path 102, the geometry of output path 102, or alternatively the space into which fluid flow 112 is directed, and the like.

Electric motor 106 is configured to drive fluid mover 104 to generate the fluid flow 112 into output path 102. In at least some embodiments, electric motor 106 is an induction motor configured to convert electrical power into mechanical power. In alternative embodiments, electric motor 106 is a permanent magnet motor. In one example, electric motor 106 is coupled to a wheel (not shown) of fluid mover 104 and is configured to rotate the wheel. In the exemplary embodiment, electric motor 106 is configured to operate at a plurality of torque output levels (i.e., torque-controlled) to increase or decrease a corresponding motor speed. Increasing or decreasing the motor speed of electric motor 106 causes electric motor 106 to drive fluid mover 104 to generate corresponding fluid flows. The fluid flow 112 generated by fluid mover 104 is at least partially a function of the motor speed of electric motor 106 and the fluid flow restriction of output path 102. In some embodiments, electric motor 106 is integrated with fluid mover 104.

Alternatively, electric motor 106 is configured to operate at a plurality of speed output levels (i.e., speed-controlled) to increase or decrease a corresponding motor torque. As in the torque-controlled embodiments, increasing or decreasing the torque of electric motor 106 causes electric motor 106 to drive fluid mover 104 to generate corresponding fluid flows.

System controller 110 and motor controller 108 is communicatively coupled to electric motor 106 to operate electric motor 106. More specifically, motor controller 108 supplies electrical power of a certain current amplitude, phase, and frequency to the stator windings of electric motor 106 to operate electric motor 106 according to instructions or commands from system controller 110 or other system. By adjusting the amplitude, phase, or frequency, motor controller 108 controls the torque (or alternatively speed in a speed-controlled embodiment) of the electric motor 106, thereby facilitating control of the speed of electric motor 106. In other embodiments, motor controller 108 may be communicatively coupled to a second controller (not shown) associated with electric motor 106. In such embodiments, motor controller 108 may be configured to transmit control signals to the second controller to instruct the second controller to operate electric motor 106. In such an embodiment, motor controller 108 may be separated, or remote, from electric motor 106. For example, motor controller 108 may be located within an HVAC assembly along with fluid mover 104 and electric motor 106. In another embodiment, for example, motor controller 108 may be located with a thermostat system or system controller 110.

Motor controller 108 includes a processor 114, a memory 116 communicatively coupled to processor 114, and a sensor system 118. Processor 114 is configured to execute instructions stored within memory 116 to cause motor controller 108 to function as described herein. For example, memory 116 is configured to store a constant fluid flow algorithm to be executed by processor 114. Memory 116 is further configured to store a plurality of coefficient values for use in the constant fluid flow algorithm. Moreover, memory 116 is configured to store data to facilitate calibrating electric motor 106. In some embodiments, motor controller 108 may include a plurality of processors 114 and/or memories 116. In other embodiments, memory 116 may be integrated with processor 114. In one example, memory 116 includes a plurality of data storage devices to store instructions and data as described herein. In alternative embodiments, an additional processor and memory may be incorporated into system controller 110 for the purpose of storing a constant fluid-flow algorithm and coefficient values, and for executing the constant fluid-flow algorithm for the purpose of controlling motor controller 108 to produce a demanded constant fluid-flow. Control system 101 is described herein as allocating the function of storing and executing the constant fluid-flow algorithm at motor controller 108, it should be understood that any processor and memory within control system 101 may carry out the functions of controlling fluid mover 104 to produce an approximately constant fluid-flow.

Typically, prior to operation of control system 101 or motor controller 108 described herein, control system 101 receives values for coefficients that result from a regression analysis of characterization data for electric motor 106 and fluid mover 104. In embodiments of the control system and methods described herein, the algorithm and its coefficients are determined during an in-field characterization process. In-field refers to any process carried out at the installation site of the electric motor or motor controller. For example, in-field characterization of a residential HVAC unit occurs in the residence itself, versus in a lab, as is convention.

The coefficients correspond to programmable variables within the constant fluid flow algorithm stored in memory within control system 101, such as, for example, on motor controller 108 and executable by processor 114 during operation. In certain embodiments, certain other constants for the constant fluid flow algorithm, or alternative constant fluid flow algorithms, may be defined and stored, for example, in memory 116, such as an EEPROM. In certain embodiments, the values for coefficients may be received from external system controller 110 or other device over a wired or wireless communication channel. In another alternative embodiment, the values for coefficients may be programmed into motor controller 108 by a technician or installer when motor controller 108 is installed.

During operation, control system 101 generally receives a fluid flow rate demand (Q) from external system controller 110 and one of motor torque (T) and motor speed (N) measured at electric motor 106. The other of motor torque (T) and motor speed (N) is computed. For example, in a torque-controlled embodiment, system controller 110 transmits a fluid flow rate demand (Q) to control system 101 or, more specifically, motor controller 108, and motor controller 108 computes a motor torque (T) to be commanded of electric motor 106 based on a measured motor speed (N). In an alternative embodiment, system controller 110 transmits a discrete selection, or an index, of a particular fluid flow rate demand (Q) from among a plurality of values stored in a table in memory 116. Motor speed (N) may be determined from the current signal supplied to the stator windings or, alternatively, may be measured directly by sensor system 118. The torque control loop then recursively executes, or iterates, until motor torque (T) converges on an objective torque. The torque control loop may execute, for example, once every 100 milliseconds. In alternative embodiments, the torque control loop period may be lengthened or shortened depending on, for example, the specific electric motor, fluid mover, or output path configuration.

Likewise, in a speed-controlled embodiment, system controller 110 transmits a fluid flow rate demand (Q) to motor controller 108, and motor controller 108 computes a motor speed (N) to be commanded of electric motor 106 based on a measured motor torque (T). As described above with respect to motor speed (N), motor torque (T) may be determined from the current signal supplied to the stator windings or, alternatively, may be measured directly by sensor system 118. The speed control loop then iterates until motor speed (N) converges on an objective speed.

Sensor system 118 includes one or more sensors configured to monitor electric motor 106. In certain embodiments, sensor system 118 is omitted and motor torque and speed are determined from the current signal supplied to the stator windings of electric motor 106. In one embodiment, sensor system 118 is configured to monitor a frequency output of motor controller 108 to electric motor 106. Sensor system 118 may monitor other data associated with electric motor 106, such as, but not limited to, motor speed, torque, power, and the like. In certain embodiments, sensor system 118 is configured to monitor a fluid flow output of fluid mover 104. For example, sensor system 118 may include an air pressure sensor configured to monitor static pressure within output path 102. In some embodiments, sensor system 118 monitors electric motor 106 from motor controller 108. In such embodiments, sensor system 118 may be integrated with control system 101 and, more specifically, with processor 114. In other embodiments, at least some sensors of sensor system 118 may be installed on electric motor 106 and transmit sensor data back to motor controller 108.

Control system 101 is configured to calibrate, or characterize, electric motor 106 and fluid mover 104 using two or more data points, including one speed-torque-fluid flow data point and at least one other speed-torque data point. Control system 101 is further configured to receive the fluid flow rate value for the speed-torque-fluid flow data point, for example, as a measured fluid flow rate value, or a value computed as a result of a heat rise test or a temperature differential measurement, or may be retrieved from a static pressure—CFM table for constant fluid flow system 100. The single fluid flow rate value defines a fluid flow-to-speed ratio that is assumed to remain constant for a given system resistance. This assumption rests on the notion that a "constant fluid flow line" in a speed-torque plane goes through the origin (i.e., zero speed and zero torque) and maintains a generally linear relationship between speed and torque for most of its range. Accordingly, control system 101 is further configured to compute a second fluid flow rate value for the one or more other speed-torque data points. The resulting fluid flow-torque-speed data points define a constant fluid flow line that further defines the operating profile of constant fluid flow system 100. Control system 101 is further configured to define a constant fluid flow algorithm, e.g., in memory 116, based on the two or more speed-torque-fluid flow data points. For example, in certain embodiments, the algorithm takes the form of a polynomial function, a tangential function, or a natural logarithm function (shown in EQ. 1-3) that define a torque correlation. In alternative embodiments, the functions may define a speed correlation.

Motor controller 108 includes a drive circuit 120. Drive circuit 120 supplies electric power to stator 107 of electric motor 106 based on control signals received from processor 114. Drive circuit 120 may include, for example, various power electronics for conditioning line frequency alternating current (AC) power to be supplied to the stator windings of electric motor 106 with a desired current, i.e., phase, amplitude, and frequency. Such power electronics may include, for example, and without limitation, one or more rectifier stages, power factor correction (PFC) circuits, filters, transient protection circuits, EMF protection circuits, inverters, or power semiconductors.

Motor controller 108 includes a communication interface 122. Communications interface 122 may include one or more wired or wireless hardware interface, such as, for example, universal serial bus (USB), RS232 or other serial bus, CAN bus, Ethernet, near field communication (NFC), WiFi, Bluetooth, or any other suitable digital or analog interface for establishing one or more communication channels among system controller 110, control system 101, and motor controller 108. For example, in certain embodiments, one or more parameters, such as a measured fluid flow rate, a computed fluid flow rate value, a maximum fluid flow rate (expressed in cubic feet per minute), fluid flow rate demand, or one or more coefficient values, may be communicated to motor controller 108 through communications interface 122 using a pulse-width modulated signal. Communications interface 122 further includes a software or firmware interface for receiving one or more motor control parameters and writing them, for example, to memory 116. In certain embodiments, communication interface 122 includes, for example, a software application programming interface (API) for supplying one or more coefficient values for a constant fluid flow algorithm. In such embodiments, received coefficient values are supplied to processor 114, processed, and stored in memory 116 along with a constant fluid flow algorithm for subsequent execution by processor 114 during operation of electric motor 106.

In certain embodiments, memory 116 is configured to store two or more constant fluid flow algorithms. Alternatively, memory 116 may be configured to store a single constant fluid flow algorithm, and one or more sets of constants to be utilized by the algorithm. In certain embodiments, electric motor 106 and motor controller 108 are configured to receive through communication interface 122 and utilize those coefficients with the constant fluid flow algorithm.

Figure 2:
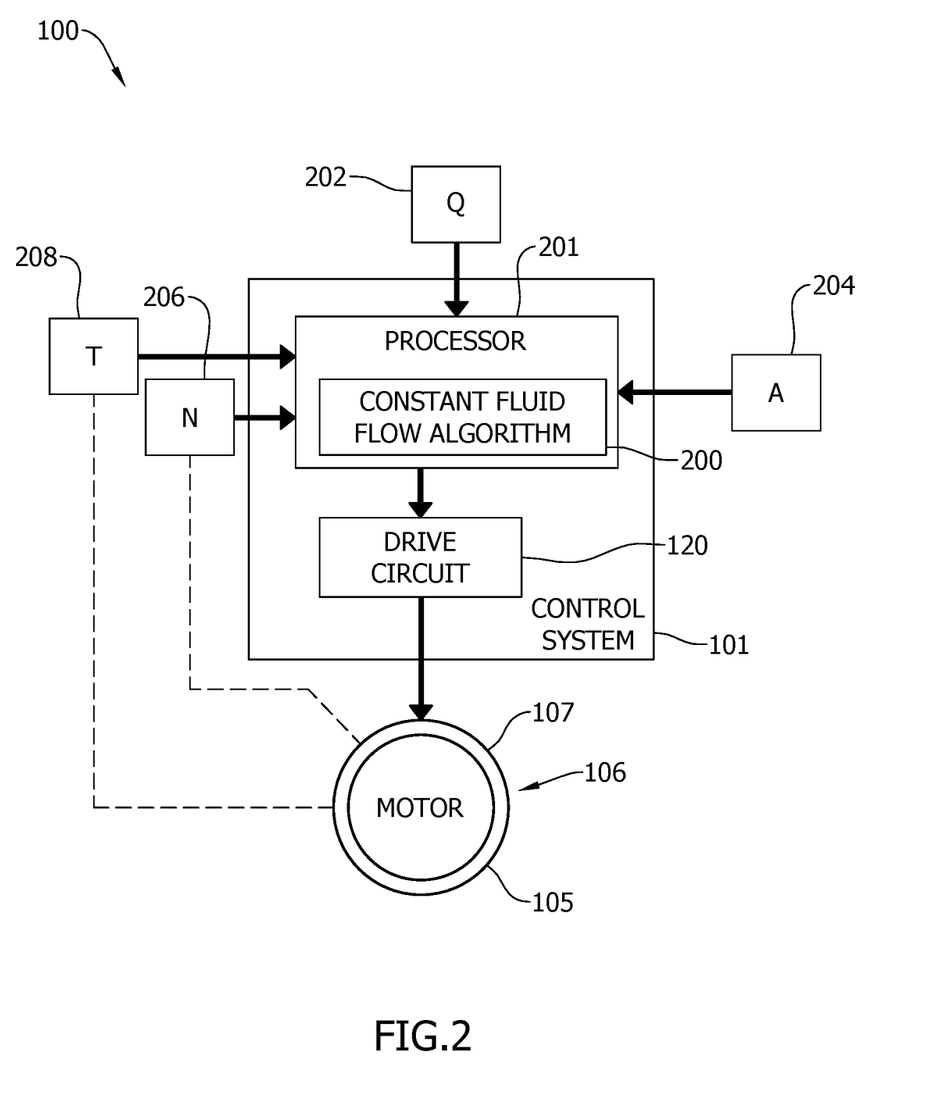
FIG. 2 is a logical block diagram of the constant fluid flow system shown in FIG. 1.

FIG. 2 is a logical block diagram of constant fluid flow system 100, including electric motor 106 and control system 101 (shown in FIG. 1). A processor 201 (e.g., processor 114 of motor controller 108, or a processor of system controller 110, or another processing device) transmits control signals to drive circuit 120 to control the amplitude, phase, and frequency of the electric power supplied to electric motor 106. Processor 201 executes, for example, a constant fluid flow algorithm 200, such as that described above in EQ. 1, EQ. 2, and EQ. 3 to compute one of a torque set point or a speed set point for controlling drive circuit 120 and electric motor 106. Execution of the algorithm is typically carried out periodically, e.g., at 10 Hertz, to update the torque set point or the speed set point. During operation, processor 201 receives a fluid flow rate demand value, Q, 202 that is used in constant fluid flow algorithm 200. Processor 201, in certain embodiments, may receive fluid flow rate demand value, Q, 202, directly from a system controller, such as system controller 110 (shown in FIG. 1). Alternatively, system controller 110 may supply fluid flow rate demand value, Q, 202 using discrete inputs representing an index into a table of fluid flow rate demand values stored in a memory from which processor 201 receives fluid flow rate demand value, Q, 202. Alternatively, system controller 110 may supply a pulse width modulated (PWM) signal that proportionately varies between two fluid flow rate demand values. In yet another alternative embodiment, system controller 110 may supply a digital command including fluid flow rate demand value, Q, 202.

Processor 201 determines coefficient values, A, 204 during an in-field characterization process. Coefficient values, A, 204 are used in constant fluid flow algorithm 200. Processor 114 may also receive coefficient values, A, 204 when constant fluid flow system 100 is, for example, powered on after characterization, and processor 201 operates with those same values from that point on unless it is reset, reprogrammed, or recalibrated by a technician or other user. Processor 201 may receive coefficient values, A, 204 from system controller 110, from a memory, such as memory 116 (shown in FIG. 1), or from another external device.

In certain embodiments, constant fluid flow algorithm 200 is selected from among multiple algorithms stored in memory 116. Memory 116 may include, for example, read-only memory such as an EEPROM. Constant fluid flow algorithm 200 is retrieved from memory 116 based on a user selection or a selection by system controller 110. In turn, for example, system controller 110 then transmits corresponding coefficient values, A, 204, a corresponding memory address for the space in memory 116 containing the appropriate coefficient values, A, 204, or an identifier, or "pointer," to such a memory address to processor 201. Processor 201 then gains access to the corresponding space in memory 116 and reads coefficient values, A, 204.

Processor 201 receives at least one of a measured speed, N, 206 or a measured torque 208 of electric motor 106. The measured value is used in constant fluid flow algorithm 200. Measured speed, N, 206, for example, may be derived from a current signal supplied to the stator windings of electric motor 106. For example, such a current signal may be measured by a current sensor and measured speed, N, 206 is derived from that measurement. Alternatively, processor 201 may receive a frequency measurement from a frequency sensor on electric motor 106, the output of which may be converted to measured speed, N, 206. Alternatively, motor speed may be measured by any other suitable method, such as by further analyzing the current signal supplied to the stator windings of electric motor 106. Measured torque, T, 208, for example, may be derived from the current signal supplied to the stator windings of electric motor 106. For example, such a current signal may be measured by a current sensor and measured torque, T, 208 is derived from that measurement, e.g., by inference that torque output is equal to the commanded torque by virtue of a closed loop control system. Alternatively, processor 201 may receive a torque measurement from a torque sensor on electric motor 106 or, alternatively, by any other suitable method.

During operation, processor 201 executes constant fluid flow algorithm 200 using the several inputs described above, including fluid flow rate demand value, Q, 202, and at least one of measured speed, N, 206 and measured torque, T, 208. Upon execution of constant fluid flow algorithm 200, processor 201 computes one of a torque set point and a speed set point that is used to control drive circuit 120. Drive circuit 120 then supplies the desired amplitude, phase, and frequency of AC electric power to electric motor 106 to turn rotor 105 and fluid mover 104 (shown in FIG. 1).

Figure 3:
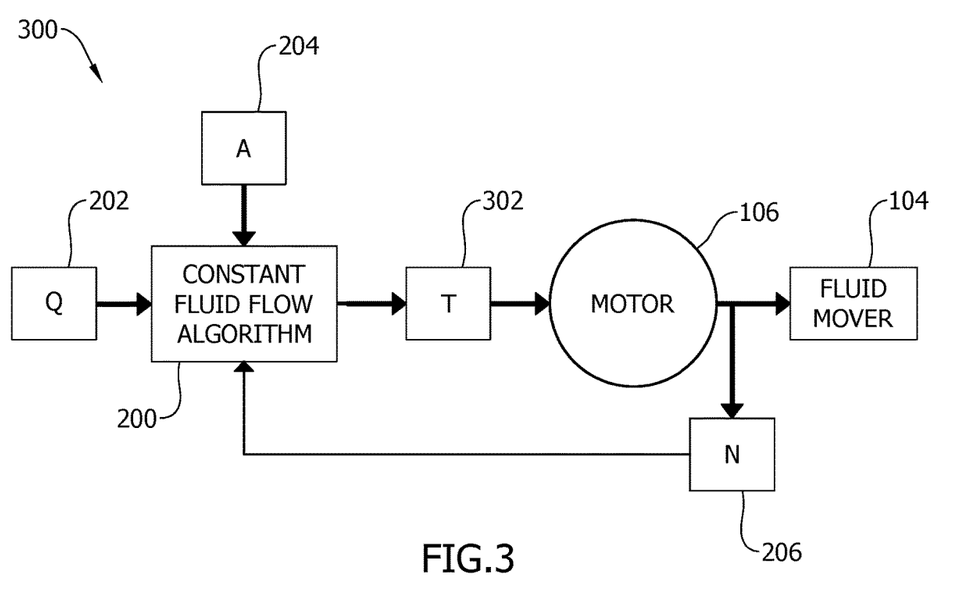
FIG. 3 is a schematic diagram of an exemplary constant fluid flow control loop for a torque-controlled electric motor.

FIG. 3 is a schematic diagram of one embodiment of constant fluid flow control loop 300 for use in controlling a torque-controlled electric motor, such as electric motor 106 of constant fluid flow system 100 (shown in FIG. 1 and FIG. 2). Control loop 300 may be embodied, for example, in motor controller 108, processor 114, or processor 201, or another processor in system controller 110 or other remote device, and illustrates control of electric motor 106 by execution of constant fluid flow algorithm 200 to compute a torque set point 302. Constant fluid flow algorithm 200 receives fluid flow rate demand, Q, 202 and measured speed, N, 206, and computes torque set point 302 based on, for example, the formulas shown in EQ. 1, EQ. 2, and EQ. 3.

Figure 4:
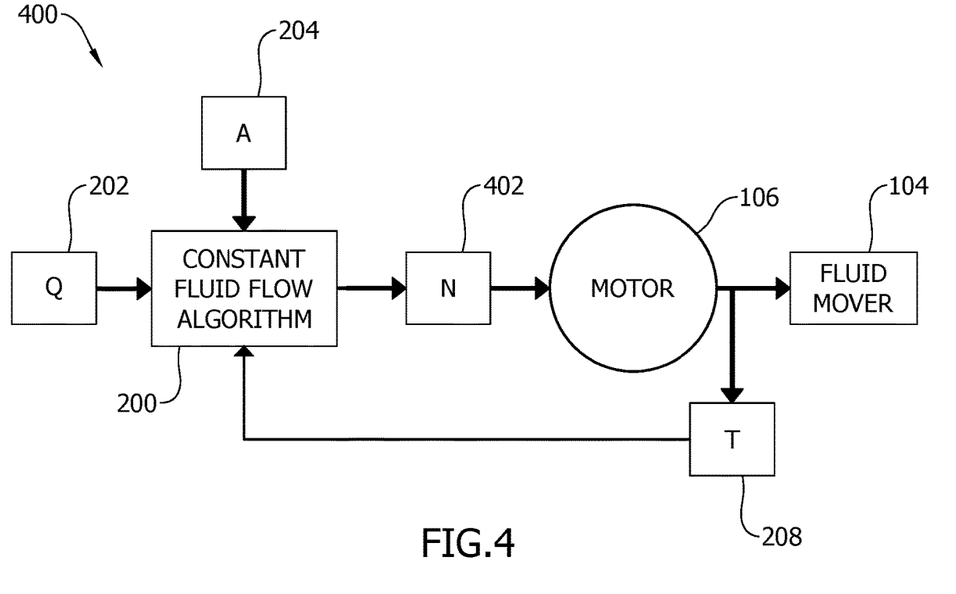
FIG. 4 is a schematic diagram of an exemplary constant fluid flow control loop for a speed-controlled electric motor.

FIG. 4 is a schematic diagram of one embodiment of a constant fluid flow control loop 400 for use in controlling a speed-controlled electric motor, such as electric motor 106 of constant fluid flow system 100 (shown in FIG. 1 and FIG. 2). Control loop 400 may be embodied, for example, in motor controller 108, processor 114, or processor 201, or another processor in system controller 110 or other remote device, and illustrates control of electric motor 106 by execution of constant fluid flow algorithm 200 to compute a speed set point 402. Constant fluid flow algorithm 200 receives fluid flow rate demand, Q, 202 and measured torque, T, 208, and computes speed set point, N, 402 based on, for example, the formulas shown in EQ. 1, EQ. 2, and EQ. 3.

Figure 5:
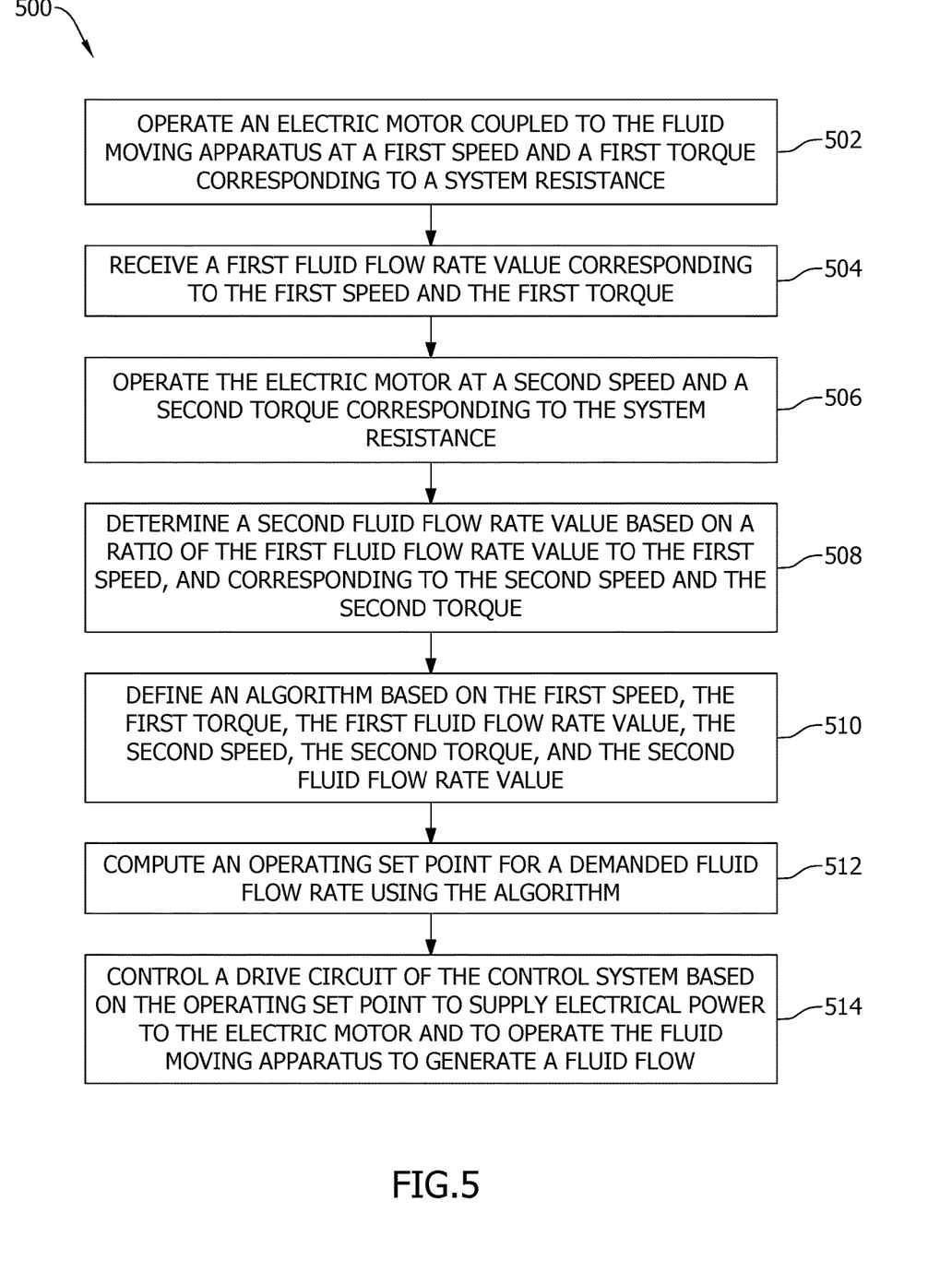
FIG. 5 is a flow diagram of an exemplary method of characterizing a fluid moving apparatus.

FIG. 5 is a flow diagram of an exemplary method of characterizing a fluid mover, such as fluid mover 104 shown in FIGS. 1-4. Fluid mover 104 then generates a fluid flow into a space, such as output path 102. Referring to FIG. 1 and FIG. 5, method 500 may be embodied in a control system having a processor, such as control system 101 and processor 201 or processor 114 of motor controller 108, or in a motor controller alone, such as motor controller 108 and processor 114 (shown in FIG. 1 and FIG. 1).

Control system 101 controls drive circuit 120 based on a set point for a first control parameter to supply electrical power to electric motor 106 and to operate fluid mover 104. The first control parameter may be torque (T) output from electric motor 106. Alternatively, the first control parameter may be speed (N). Control system 101 determines a feedback parameter corresponding to the set point for the first control parameter. The feedback parameter may, in certain embodiments, be speed (N). In alternative embodiments, the feedback parameter may be torque (T). The first control parameter and the feedback parameter, in combination, include a speed (N) and a torque (T). For example, in one embodiment, the first control parameter is torque (T) and the feedback parameter is speed (N). In an alternative embodiment, the first parameter is speed (N) and the feedback parameter is torque (T).

Control system 101 controls drive circuit 120 to operate 502 electric motor 106 and fluid mover 104 at a first speed and a first torque corresponding to a system resistance. Control system 101 receives 504 a first fluid flow rate value corresponding to the first speed and the first torque, for example, through communication interface 122 or from sensor 118. Likewise, control system 101 operates 506 electric motor 106 and fluid mover 104 at a second speed and a second torque corresponding to the system resistance. Control system 101 determines 508 a second fluid flow rate value corresponding to the second torque and second speed based on a ratio of the first fluid flow rate value to the first speed. Control system 101, for example, may determine 508 the second fluid flow rate value based on a measurement of fluid flow rate while operating at the second torque and the second speed, or may compute the second fluid flow rate value from the ratio of the first fluid flow rate value to the first speed.

Control system 101 defines 510 an algorithm in memory 116 based on the data points, e.g., the first speed, torque, and fluid flow rate value, and the second speed, torque, and fluid flow rate value. Control system 101 may define 510 the algorithm, for example, in the form of the torque correlations shown in EQ. 1-3.

During or before operation, control system 101 receives a fluid flow rate demand value (Q). This value may be received, for example, from remote system controller 110. The fluid flow rate demand value may be transmitted as, for example, a digital formatted value or, alternatively, a continuous pulse-width modulated signal representing the desired fluid flow rate demand (Q). An operating set point for the fluid flow rate demand value (Q) is computed 512 using the algorithm, e.g., constant fluid flow algorithm 200. The operating set point is then used by control system 101 to control 514 drive circuit 120 to supply electrical power to electric motor 106 and to operate fluid mover 104 to generate the fluid flow.

The methods and systems described herein may be implemented using computer programming or engineering techniques including computer software, firmware, hardware or any combination or subset thereof, wherein the technical effect may include at least one of: (a) enabling in-field characterization of an electric motor and fluid moving apparatus; (b) simplifying configuration of original and replacement motors for constant fluid flow systems; (c) eliminating the need for testing at multiple system resistances for original and replacement motors in constant fluid flow systems; and (d) reducing variation in constant fluid flow performance by characterizing in the field versus in a lab.

In the foregoing specification and the claims that follow, a number of terms are referenced that have the following meanings.

As used herein, an element or step recited in the singular and preceded with the word "a" or "an" should be understood as not excluding plural elements or steps, unless such exclusion is explicitly recited. Furthermore, references to "example implementation" or "one implementation" of the present disclosure are not intended to be interpreted as excluding the existence of additional implementations that also incorporate the recited features.

"Optional" or "optionally" means that the subsequently described event or circumstance may or may not occur, and that the description includes instances where the event occurs and instances where it does not.

Approximating language, as used herein throughout the specification and claims, may be applied to modify any quantitative representation that could permissibly vary without resulting in a change in the basic function to which it is related. Accordingly, a value modified by a term or terms, such as "about," "approximately," and "substantially," are not to be limited to the precise value specified. In at least some instances, the approximating language may correspond to the precision of an instrument for measuring the value. Here, and throughout the specification and claims, range limitations may be combined or interchanged. Such ranges are identified and include all the sub-ranges contained therein unless context or language indicates otherwise.

Disjunctive language such as the phrase "at least one of X, Y, or Z," unless specifically stated otherwise, is generally understood within the context as used to state that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present. Additionally, conjunctive language such as the phrase "at least one of X, Y, and Z," unless specifically stated otherwise, should also be understood to mean X, Y, Z, or any combination thereof, including "X, Y, and/or Z."

Some embodiments involve the use of one or more electronic processing or computing devices. As used herein, the terms "processor" and "computer" and related terms, e.g., "processing device," "computing device," and "controller" are not limited to just those integrated circuits referred to in the art as a computer, but broadly refers to a processor, a processing device, a controller, a general purpose central processing unit (CPU), a graphics processing unit (GPU), a microcontroller, a microcomputer, a programmable logic controller (PLC), a reduced instruction set computer (RISC) processor, a field programmable gate array (FPGA), a digital signal processing (DSP) device, an application specific integrated circuit (ASIC), and other programmable circuits or processing devices capable of executing the functions described herein, and these terms are used interchangeably herein. The above embodiments are examples only, and thus are not intended to limit in any way the definition or meaning of the terms processor, processing device, and related terms.

In the embodiments described herein, memory may include, but is not limited to, a non-transitory computer-readable medium, such as flash memory, a random access memory (RAM), read-only memory (ROM), erasable programmable read-only memory (EPROM), electrically erasable programmable read-only memory (EEPROM), and non-volatile RAM (NVRAM). As used herein, the term "non-transitory computer-readable media" is intended to be representative of any tangible, computer-readable media, including, without limitation, non-transitory computer storage devices, including, without limitation, volatile and non-volatile media, and removable and non-removable media such as a firmware, physical and virtual storage, CD-ROMs, DVDs, and any other digital source such as a network or the Internet, as well as yet to be developed digital means, with the sole exception being a transitory, propagating signal. Alternatively, a floppy disk, a compact disc-read only memory (CD-ROM), a magneto-optical disk (MOD), a digital versatile disc (DVD), or any other computer-based device implemented in any method or technology for short-term and long-term storage of information, such as, computer-readable instructions, data structures, program modules and sub-modules, or other data may also be used. Therefore, the methods described herein may be encoded as executable instructions, e.g., "software" and "firmware," embodied in a non-transitory computer-readable medium. Further, as used herein, the terms "software" and "firmware" are interchangeable, and include any computer program stored in memory for execution by personal computers, workstations, clients and servers. Such instructions, when executed by a processor, cause the processor to perform at least a portion of the methods described herein.

Also, in the embodiments described herein, additional input channels may be, but are not limited to, computer peripherals associated with an operator interface such as a mouse and a keyboard. Alternatively, other computer peripherals may also be used that may include, for example, but not be limited to, a scanner. Furthermore, in the exemplary embodiment, additional output channels may include, but not be limited to, an operator interface monitor.

The systems and methods described herein are not limited to the specific embodiments described herein, but rather, components of the systems and/or steps of the methods may be utilized independently and separately from other components and/or steps described herein.

Although specific features of various embodiments of the disclosure may be shown in some drawings and not in others, this is for convenience only. In accordance with the principles of the disclosure, any feature of a drawing may be referenced and/or claimed in combination with any feature of any other drawing.

This written description uses examples to provide details on the disclosure, including the best mode, and also to enable any person skilled in the art to practice the disclosure, including making and using any devices or systems and performing any incorporated methods. The patentable scope of the disclosure is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A control system for an electric motor configured to drive a fluid moving apparatus to generate a fluid flow, said control system comprising:
   a drive circuit configured to regulate electrical power supplied to a stator of the electric motor to turn a rotor of the electric motor and generate the fluid flow; and
   a processor coupled to said drive circuit and configured to:
      control said drive circuit to operate the electric motor at a first speed and a first torque, and at a second speed and a second torque;
      receive a first fluid flow rate value corresponding to the first speed and the first torque;
      determine a second fluid flow rate value based on a ratio of the first fluid flow rate value to the first speed, and corresponding to the second speed and the second torque;
      define an algorithm, in a memory coupled to the processor, based on the first speed, the first torque, the first fluid flow rate value, the second speed, the second torque, and the second fluid flow rate value;
      compute an operating set point for a demanded fluid flow rate using the algorithm; and
      control said drive circuit based on the operating set point to supply electrical power to the electric motor and to operate the fluid moving apparatus to generate the fluid flow.

2. The control system of claim 1, wherein said processor is further configured to control said drive circuit to operate the electric motor at the first speed and the first torque, and at the second speed and the second torque for a single system resistance.

3. The control system of claim 1, wherein said processor is further configured to determine the first fluid flow rate value based on a measurement received from a fluid flow sensor.

4. The control system of claim 1, wherein said processor is further configured to determine the first fluid flow rate value based on actuation of a pressure switch.

5. The control system of claim 1, wherein said processor is further configured to define the algorithm as a torque correlation in the form of a polynomial function defining torque as a function of speed and fluid flow, the polynomial having a first term defined as a function of a product of speed and fluid flow, and a second term defined as a function of speed.

6. The control system of claim 1, wherein said processor is further configured to define the algorithm as a torque correlation in the form of a tangential function defining torque as a function of speed and fluid flow, the tangential function having a numerator defined as a function of speed, and a denominator defined as a tangent function having an operand defined as a function of fluid flow.

7. The control system of claim 1, wherein said processor is further configured to define the algorithm as a torque correlation in the form of a natural logarithm function having a numerator defined as a function of speed, and a denominator having at least one term defined as a natural logarithm of fluid flow.

8. The control system of claim 1, wherein said processor is further configured to define the algorithm as a speed correlation defining speed as a function of torque and fluid flow.

9. A method of characterizing a fluid moving apparatus, said method comprising:
   operating an electric motor coupled to the fluid moving apparatus at a first speed and a first torque corresponding to a system resistance;
   receiving, at a control system for the electric motor, a first fluid flow rate value corresponding to the first speed and the first torque;
   operating the electric motor at a second speed and a second torque corresponding to the system resistance;
   determine, by the control system, a second fluid flow rate value based on a ratio of the first fluid flow rate value to the first speed, and corresponding to the second speed and the second torque;
   defining an algorithm, in a memory for the control system, based on the first speed, the first torque, the first fluid flow rate value, the second speed, the second torque, and the second fluid flow rate value;
   computing an operating set point for a demanded fluid flow rate using the algorithm; and
   controlling a drive circuit of the control system based on the operating set point to supply electrical power to the electric motor and to operate the fluid moving apparatus to generate a fluid flow.

10. The method of claim 9, wherein operating the electric motor at the first speed and the first torque comprises operating at a first torque set point and measuring the first speed.

11. The method of claim 9, wherein defining the algorithm comprises defining a torque correlation in the form of $T = x_1 NQ + x_2 N$,
    where, T is torque, N is speed, Q is fluid flow, and $X_1$ and $X_2$ are constants derived from the first speed, the first torque, the first fluid flow rate value, the second speed, the second torque, and the second fluid flow rate value.

12. The method of claim 9, wherein defining the algorithm comprises defining a torque correlation in the form of $T = N/\tan(x_1 Q + x_2)$,
    where, T is torque, N is speed, Q is fluid flow, and $X_1$ and $X_2$ are constants derived from the first speed, the first torque, the first fluid flow rate value, the second speed, the second torque, and the second fluid flow rate value.

13. The method of claim 9, wherein defining the algorithm comprises defining a torque correlation in the form of $T = N/x_1 \ln(Q) + x_2$,
    where, T is torque, N is speed, Q is fluid flow, and $X_1$ and $X_2$ are constants derived from the first speed, the first torque, the first fluid flow rate value, the second speed, the second torque, and the second fluid flow rate value.

14. The method of claim 9, wherein defining the algorithm comprises defining a speed correlation defining speed as a function of torque and fluid flow.

15. The method of claim 9, wherein the first speed and the first torque are different from the second speed and the second torque.

16. An electric motor for a constant fluid flow system, said electric motor comprising:
   a rotor coupled to a fluid moving apparatus configured to generate a fluid flow upon rotation of said rotor;
   a stator;
   a drive circuit configured to regulate electrical power supplied to said stator to turn said rotor; and
   a processor coupled to said drive circuit and configured to:
      control said drive circuit to turn said rotor at a first speed and a first torque, and at a second speed and a second torque;
      receive a first fluid flow rate value corresponding to the first speed and the first torque;

determine a second fluid flow rate value based on a ratio of the first fluid flow rate value to the first speed, and corresponding to the second speed and the second torque;

define an algorithm, in a memory coupled to the processor, based on the first speed, the first torque, the first fluid flow rate value, the second speed, the second torque, and the second fluid flow rate value;

compute an operating set point for a demanded fluid flow rate using the algorithm; and control said drive circuit based on the operating set point to supply electrical power to said stator and to operate the fluid moving apparatus to generate the fluid flow.

17. The electric motor of claim 16, wherein said processor is further configured to define the algorithm as a torque correlation in the form of $T=x_1 NQ+x_2 N$, where, T is torque, N is speed, Q is fluid flow, and $X_1$ and $X_2$ are constants derived from the first speed, the first torque, the first fluid flow rate value, the second speed, the second torque, and the second fluid flow rate value.

18. The electric motor of claim 16, wherein said processor is further configured to define the algorithm as a torque correlation in the form of $T=N/\tan(x_1 Q+x_2)$, where, T is torque, N is speed, Q is fluid flow, and $X_1$ and $X_2$ are constants derived from the first speed, the first torque, the first fluid flow rate value, the second speed, the second torque, and the second fluid flow rate value.

19. The electric motor of claim 16, wherein said processor is further configured to define the algorithm as a torque correlation in the form of $T=N/x_1 \ln(Q)+x_2$, where, T is torque, N is speed, Q is fluid flow, and $X_1$ and $X_2$ are constants derived from the first speed, the first torque, the first fluid flow rate value, the second speed, the second torque, and the second fluid flow rate value.

20. The electric motor of claim 16, wherein said processor is further configured to define the algorithm as a speed correlation defining speed as a function of torque and fluid flow rate.

21. The electric motor of claim 16 further comprising a communication interface through which the first fluid flow rate value is received.

\* \* \* \* \*